United States Patent
Omura et al.

(10) Patent No.: US 10,654,631 B2
(45) Date of Patent: May 19, 2020

(54) GAS BARRIER FILM AND GAS BARRIER LAMINATE

(71) Applicant: TOPPAN PRINTING CO., LTD., Tokyo (JP)

(72) Inventors: Yuki Omura, Tokyo (JP); Sayaka Hoshi, Tokyo (JP); Junichi Kaminaga, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/297,879

(22) Filed: Oct. 19, 2016

(65) Prior Publication Data

US 2017/0036832 A1    Feb. 9, 2017

Related U.S. Application Data

(63) Continuation of application No. PCT/JP2015/062493, filed on Apr. 24, 2015.

(30) Foreign Application Priority Data

Apr. 25, 2014    (JP) ................... 2014-091988

(51) Int. Cl.
    *B65D 65/40*       (2006.01)
    *B32B 9/00*        (2006.01)
    (Continued)

(52) U.S. Cl.
    CPC ............... *B65D 65/40* (2013.01); *B32B 9/00* (2013.01); *C08J 7/042* (2013.01); *B32B 7/04* (2013.01); *B32B 7/12* (2013.01); *B32B 27/08* (2013.01); *B32B 27/18* (2013.01); *B32B 27/20* (2013.01); *B32B 27/26* (2013.01); *B32B 27/32* (2013.01);
    (Continued)

(58) Field of Classification Search
    CPC ........ B65D 65/40; B32B 27/306; B32B 27/40
    See application file for complete search history.

(56) References Cited

U.S. PATENT DOCUMENTS 3,884,713 A * 5/1975 Langley .............. C09B 67/0032
                                                     106/499
4,654,082 A * 3/1987 Frilette ................... C09D 11/08
                                                     101/491

(Continued)

FOREIGN PATENT DOCUMENTS

JP     H06-093133 A     4/1994
JP     07-268308 A * 10/1995
(Continued)

OTHER PUBLICATIONS

English machine translation of JP2003-213205 (Onitsuka et al.), obtained on Aug. 22, 2017 from JPO.*

(Continued)

*Primary Examiner* — Vivian Chen
(74) *Attorney, Agent, or Firm* — Foley & Lardner LLP

(57) ABSTRACT

A gas barrier film according to the present invention includes: a resin film substrate; a first layer made of an aqueous coating agent (C) that contains a water soluble polymer (A) and an inorganic layered mineral (B); and a second layer made of a coating agent (D) that contains titanium oxide, the first layer and the second layer being disposed in this order on at least one surface of the resin film substrate.

2 Claims, 1 Drawing Sheet

(51) Int. Cl.

| | | |
|---|---|---|
| *C08J 7/04* | (2020.01) | |
| *B32B 7/12* | (2006.01) | |
| *B32B 7/04* | (2019.01) | |
| *B32B 27/20* | (2006.01) | |
| *B32B 27/26* | (2006.01) | |
| *B32B 27/32* | (2006.01) | |
| *B32B 27/08* | (2006.01) | |
| *B32B 27/18* | (2006.01) | |
| *B32B 27/36* | (2006.01) | |
| *C08K 3/22* | (2006.01) | |
| *C08K 5/29* | (2006.01) | |
| *C08K 3/013* | (2018.01) | |
| *C08K 5/00* | (2006.01) | |
| *C08K 3/34* | (2006.01) | |
| *C09J 175/04* | (2006.01) | |
| *C08L 29/04* | (2006.01) | |
| *C08L 75/04* | (2006.01) | |
| *C08L 27/06* | (2006.01) | |
| *C09J 175/06* | (2006.01) | |
| *C09D 127/06* | (2006.01) | |
| *C09D 7/60* | (2018.01) | |
| *C09D 129/04* | (2006.01) | |
| *C09D 7/40* | (2018.01) | |
| *C09D 175/04* | (2006.01) | |
| *C08J 3/20* | (2006.01) | |
| *C08J 3/205* | (2006.01) | |

(52) U.S. Cl.
CPC .......... *B32B 27/36* (2013.01); *B32B 2250/05* (2013.01); *B32B 2250/24* (2013.01); *B32B 2255/10* (2013.01); *B32B 2255/26* (2013.01); *B32B 2264/10* (2013.01); *B32B 2264/102* (2013.01); *B32B 2307/518* (2013.01); *B32B 2307/7242* (2013.01); *B32B 2307/7244* (2013.01); *B32B 2323/10* (2013.01); *B32B 2367/00* (2013.01); *B65D 2565/387* (2013.01); *C08J 3/20* (2013.01); *C08J 3/205* (2013.01); *C08J 7/04* (2013.01); *C08K 3/013* (2018.01); *C08K 3/22* (2013.01); *C08K 3/34* (2013.01); *C08K 5/0025* (2013.01); *C08K 5/29* (2013.01); *C08K 2003/2237* (2013.01); *C08K 2003/2241* (2013.01); *C08L 27/06* (2013.01); *C08L 29/04* (2013.01); *C08L 75/04* (2013.01); *C08L 2201/14* (2013.01); *C08L 2201/54* (2013.01); *C08L 2312/00* (2013.01); *C08L 2314/00* (2013.01); *C09D 7/40* (2018.01); *C09D 7/60* (2018.01); *C09D 127/06* (2013.01); *C09D 129/04* (2013.01); *C09D 175/04* (2013.01); *C09J 175/04* (2013.01); *C09J 175/06* (2013.01); *Y10T 428/1341* (2015.01); *Y10T 428/1379* (2015.01); *Y10T 428/251* (2015.01); *Y10T 428/253* (2015.01); *Y10T 428/3158* (2015.04); *Y10T 428/3192* (2015.04); *Y10T 428/31565* (2015.04); *Y10T 428/31573* (2015.04); *Y10T 428/31645* (2015.04); *Y10T 428/31786* (2015.04); *Y10T 428/31797* (2015.04); *Y10T 428/31909* (2015.04); *Y10T 428/31913* (2015.04); *Y10T 428/31935* (2015.04); *Y10T 428/31938* (2015.04)

(56) References Cited

U.S. PATENT DOCUMENTS

| | | | | | |
|---|---|---|---|---|---|
| 4,804,584 | A | * | 2/1989 | Nakashima | B32B 27/32 428/424.2 |
| 4,927,677 | A | * | 5/1990 | Kasai | B32B 27/08 428/36.6 |
| 5,043,015 | A | * | 8/1991 | Yau | C09D 17/008 106/311 |
| 5,049,194 | A | * | 9/1991 | Jaramillo | C09D 17/008 106/311 |
| 5,100,720 | A | * | 3/1992 | Sawada | C08J 7/045 428/215 |
| 5,700,560 | A | * | 12/1997 | Kotani | B32B 27/18 428/325 |
| 5,766,751 | A | * | 6/1998 | Kotani | B32B 27/06 428/323 |
| 5,853,862 | A | * | 12/1998 | Murai | B32B 27/06 428/215 |
| 5,942,298 | A | * | 8/1999 | Sakaya | B41M 1/00 428/36.6 |
| 5,981,029 | A | * | 11/1999 | Harada | C08J 7/047 428/143 |
| 6,004,707 | A | * | 12/1999 | Tano | B82Y 15/00 347/112 |
| 6,083,605 | A | * | 7/2000 | Harada | C08J 7/047 428/143 |
| 6,146,750 | A | * | 11/2000 | Kotani | B32B 27/06 428/323 |
| 6,288,201 | B1 | * | 9/2001 | Sasano | C08G 18/4211 528/59 |
| 6,316,093 | B1 | * | 11/2001 | Kotani | B32B 27/06 428/323 |
| 6,858,106 | B1 | * | 2/2005 | Ikenoya | B32B 15/08 156/184 |
| 10,155,365 | B2 | * | 12/2018 | Omori | B32B 27/00 |
| 2001/0000254 | A1 | * | 4/2001 | Tanaka | C08J 5/18 525/88 |
| 2002/0143102 | A1 | * | 10/2002 | Sasano | B32B 7/12 524/589 |
| 2003/0089271 | A1 | * | 5/2003 | Hirano | C09D 11/037 106/31.9 |
| 2004/0058157 | A1 | * | 3/2004 | Ishikawa | C08J 7/04 428/411.1 |
| 2005/0084686 | A1 | * | 4/2005 | Imaizumi | C08G 18/0823 428/425.5 |
| 2007/0031679 | A1 | * | 2/2007 | Ushida | C08G 18/0823 428/423.1 |
| 2007/0269664 | A1 | * | 11/2007 | Fujii | C08J 7/045 428/447 |
| 2008/0066239 | A1 | * | 3/2008 | Zhu | C09D 11/36 8/525 |
| 2008/0206556 | A1 | * | 8/2008 | Kuwahara | C08J 7/04 428/335 |
| 2009/0148640 | A1 | * | 6/2009 | Yoshida | B32B 7/12 428/36.6 |
| 2009/0274894 | A1 | * | 11/2009 | Yoshida | B32B 27/30 428/319.1 |
| 2011/0045251 | A1 | * | 2/2011 | Kazeto | C08J 7/047 428/174 |
| 2012/0016075 | A1 | * | 1/2012 | Uchida | C08G 18/0823 524/591 |
| 2013/0079453 | A1 | * | 3/2013 | Kraiter | C09D 11/326 524/430 |
| 2013/0199725 | A1 | * | 8/2013 | Gentschev | C08G 18/10 156/334 |
| 2014/0212661 | A1 | * | 7/2014 | Khan | C08G 18/0823 428/341 |
| 2014/0287206 | A1 | * | 9/2014 | Sasada | B41J 2/01 428/207 |
| 2014/0370270 | A1 | * | 12/2014 | Kaminaga | B32B 27/40 428/324 |

FOREIGN PATENT DOCUMENTS

| | | | |
|---|---|---|---|
| JP | 09-151265 | A * | 6/1997 |
| JP | H09-150484 | A | 6/1997 |
| JP | H11-165369 | A | 6/1999 |
| JP | 2001-287294 | A | 10/2001 |
| JP | 3351208 | B2 | 11/2002 |
| JP | 2005-047209 | A * | 2/2005 |
| JP | 2006-111649 | A * | 4/2006 |
| JP | 3764109 | B2 | 4/2006 |

(56) References Cited

FOREIGN PATENT DOCUMENTS

| | | | | |
|---|---|---|---|---|
| JP | 2011-122064 A | * | 6/2011 | |
| JP | 2012-046587 A | * | 3/2013 | |
| JP | 2003-213205 | * | 7/2013 | |
| WO | WO 2004-020309 A | * | 3/2004 | |
| WO | WO-2013/129520 A1 | | 9/2013 | |

OTHER PUBLICATIONS

Chinese Office Action issued in corresponding Chinese Patent Application No. 201580021462.4, dated Dec. 5, 2017.

* cited by examiner

GAS BARRIER FILM AND GAS BARRIER LAMINATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/062493 filed on Apr. 24, 2015, which is based upon and claims the benefit of priority of Japanese Patent Application No. 2014-091988, filed on Apr. 25, 2014, the entireties of which are hereby incorporated by reference.

TECHNICAL FIELD

The present invention relates to gas barrier films and gas barrier laminates used in the packaging field for food products such as dried food, sweets, bread and delicacies which are sensitive to moisture and oxygen, and for pharmaceutical products such as disposable body warmers, tablets, powders, skin patches and adhesive patches.

BACKGROUND

Packaging materials used for packaging food products or pharmaceutical products require properties (gas barrier properties) to protect the product inside from moisture, oxygen and other gases that degrade the product in order to prevent the product from being degraded or decaying and retain the functions and nature of the product.

Accordingly, conventional packaging materials have been provided with a gas barrier layer made of a material having gas barrier properties. The gas barrier layer has been formed on a substrate such as a film or paper by sputtering, vapor deposition, wet coating or printing. Further, the gas barrier layer has been formed of a metal foil or a metal deposition film made of a metal such as aluminum, or a resin film made of a material such as polyvinyl alcohol, ethylene-vinyl alcohol copolymer or polyvinylidene chloride (e.g., see PTLs 1 to 5).

Although metal foils and metal deposition films have good gas barrier properties, they have various problems, for example, that recognition of products is not possible due to the opaqueness of the metal foil or metal deposition film, cracks occur with only several percent of elongation due to the low elasticity, thus leading to lowering of the gas barrier properties, and the package has to be treated as an incombustible material when discarded after use.

Further, although gas barrier layers made of a polyvinylidene chloride resin film have good gas barrier properties without humidity dependence, they contain chlorine and may become a source of generating harmful substances such as dioxins during disposal treatment. As a consequence, gas barrier layers made of a resin film are unpopular for use as packaging materials.

On the other hand, gas barrier layers made of a resin film of non-chlorine polyvinyl alcohol or ethylene-vinyl alcohol copolymer have high gas barrier properties in a low-humidity atmosphere. However, since they are humidity-dependent, they have disadvantages that the gas barrier properties significantly decrease with increase in humidity.

Other types of gas barrier resin films are inferior in gas barrier properties to polyvinylidene chloride resin films or polyvinyl alcohol resin films that are placed in a low-humidity atmosphere.

In order to improve gas barrier properties of these resin films, there has been proposed a resin film that is made of a composite of polyvinyl alcohol or ethylene-vinyl alcohol copolymer and an inorganic layered mineral. In such a resin film, the inorganic layered mineral should be orderly distributed and arranged in the film so as to improve gas barrier properties. However, the regular distribution and arrangement of the inorganic layered mineral will lead to lowering in cohesiveness of the resin film or adhesiveness to the substrate. Consequently, it is quite difficult to balance high gas barrier properties with sufficient laminate strength as a packaging material.

In view of the above, a gas barrier film has been proposed in which an aqueous polyurethane resin having water solubility or water dispersibility is added to a composite made of polyvinyl alcohol or ethylene-vinyl alcohol copolymer and a layered compound so as to improve adhesiveness to the substrate (e.g., see PTL 6).

This gas barrier film has good gas barrier properties in a high-humidity atmosphere and good adhesiveness to the substrate. However, due to the inferiority in cohesive strength, the gas barrier film exhibits poor laminate strength when laminated to another film for use as a packing material.

CITATION LIST

Patent Literature

[PTL 1] JP-A-2001-287294
[PTL 2] JP-A-H11-165369
[PTL 3] JP-A-H06-093133
[PTL 4] JP-A-H09-150484
[PTL 5] JP-B-3764109
[PTL 6] JP-B-3351208

SUMMARY OF THE INVENTION

Technical Problem

The present invention has been made in view of the above circumstances, and has an object to provide a gas barrier film and gas barrier laminate having good gas barrier properties in a high-humidity atmosphere and having sufficient adhesiveness and film cohesive strength as a packaging material for an extended period of time to minimize decrease in laminate strength.

Solution to Problem

According to a first aspect of the present invention, a gas barrier film includes a resin film substrate, a first layer made of an aqueous coating agent (C) that contains a water soluble polymer (A) and an inorganic layered mineral (B), and a second layer made of a coating agent (D) that contains titanium oxide, which are disposed in this order on at least one surface of the resin film substrate.

In the first aspect, the aqueous coating agent (C) may contain an aqueous polyurethane resin having water solubility or water dispersibility, a curing agent, the water soluble polymer (A) and the inorganic layered mineral (B).

In the first aspect, the water soluble polymer (A) may be a polyvinyl alcohol resin.

In the first aspect, the inorganic layered mineral (B) may be a water-swellable synthetic mica.

According to a second aspect of the present invention, a gas barrier laminate includes the gas barrier film according to the first aspect, an adhesive layer and a heat seal resin layer disposed in this order on at least one surface of the gas barrier film.

Advantageous Effects of Invention

According to the above aspects of the present invention, a layer having gas barrier properties and adhesiveness to the resin film substrate is formed on at least one surface of the resin film substrate and a layer containing titanium oxide is then formed on the above layer, thereby reinforcing the film cohesiveness of those layers. Accordingly, a gas barrier film and a gas barrier laminate having good gas barrier properties in a high-humidity atmosphere and having good adhesiveness between layers and film cohesiveness for an extended period of time can be provided. Therefore, use of the gas barrier film and the gas barrier laminate according to aspects of the present invention as a packaging material can improve the preservation of the product in the package.

DESCRIPTION OF REPRESENTATIVE EMBODIMENTS

Figure 1:
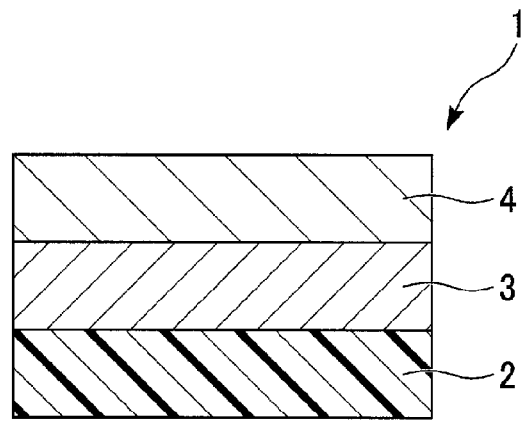
FIG. 1 is a cross sectional view of an example of a gas barrier film according to a first embodiment of the present invention.
Figure 2:
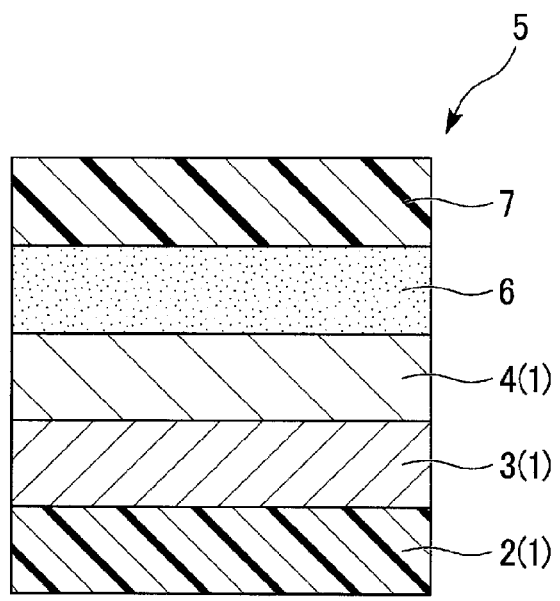
FIG. 2 is a cross sectional view of an example of a gas laminate according to a second embodiment of the present invention.

Hereinafter, an embodiment or embodiments of the present invention will be described in detail. Note that, the present invention should not be limited to the following embodiment(s), which are simply representative of the present invention.

A gas barrier film 1 according to a first embodiment of the present invention and a gas barrier laminate according to a second embodiment of the present invention will be described.

This embodiment is specifically described for better understanding of the principle of the invention, and should not be construed to limit the present invention unless otherwise specified.

Gas Barrier Film 1

A gas barrier film 1 according to a first embodiment of the present invention includes a resin film substrate 2, a layer 3 (hereinafter, also referred to as a "first layer" or "gas barrier layer") made of an aqueous coating agent (C) that contains a water soluble polymer (A) and an inorganic layered mineral (B), and a layer 4 (hereinafter, also referred to as a "second layer" or "titanium oxide-containing layer") made of a coating agent (D) that contains titanium oxide, which are disposed in this order on at least one surface of the resin film substrate 2.

That is, the gas barrier film 1 according to the present embodiment is made up of the resin film substrate 2, the gas barrier layer 3 and the titanium oxide-containing layer 4, which are disposed in this order.

Resin Film Substrate 2

Materials for the resin film substrate 2 include, for example, films made of olefin resins including polyethylene, polypropylene and propylene-ethylene copolymer; polyester resins including polyethylene terephthalate and polybutylene terephthalate; aliphatic polyamides including nylon 6 and nylon 66; polyamide resins including aromatic polyamides such as polymetaxylylene adipamide; vinyl resins including polystyrene, polyvinyl acetate, ethylene-vinyl acetate copolymer, polyvinyl alcohol and ethylene-vinylalcohol copolymer; acryl resins including homopolymers or copolymers of (meth)acryl monomers such as polymethyl methacrylate and polyacrylonitrile; and cellophanes. These resins may be used singly or in combination of two or more.

The resin film substrate 2 used is a single-layer film made of a single resin, a single-layer film made of a plurality of resins or a laminated film made of a plurality of resins. Alternatively, a laminated substrate formed by laminating the above resins on another substrate (metal, wood, paper, ceramic or the like) may be used.

Among others, a polyolefin resin film (particularly, such as a polypropylene film), a polyester resin film (particularly, a polyethylene terephthalate resin film), a polyamide resin film (particularly, a nylon film) or the like is advantageously used for the resin film substrate 2.

The resin film substrate 2 may be a non-stretched film, uniaxially or biaxially stretched film, or may be a surface-treated film (e.g., corona discharge treatment), anchor coated or undercoated film. Further, the resin film substrate may be a laminated film in which a plurality of resins or metals are laminated.

The resin film substrate 2 may also be processed with corona treatment, low temperature plasma treatment or the like on the surface to be coated (the surface on which the above layers are formed) in order to improve wettability to a coating agent and adhesion strength to the layers.

The thickness of the resin film substrate 2 is not specifically limited, but may be appropriately selected depending on the cost or applications while taking account of the suitability as a packaging material or the lamination suitability to other layers. Practically, the thickness is in the range from 3 μm to 200 μm, preferably in the range from 5 μm to 120 μm, and more preferably in the range from 10 μm to 100 μm.

Aqueous Coating Agent (C)

The aqueous coating agent (C) is required to have oxygen barrier properties in a high-humidity atmosphere. In order to meet this requirement, the aqueous coating agent (C) contains, for example, the water soluble polymer (A) having water solubility or water dispersibility, and the inorganic layered mineral (B) as a main constituent.

Water Soluble Polymer (A)

The water soluble polymer (A) refers to a polymer that can be completely dissolved in water or finely dispersed in water at a normal temperature.

The water soluble polymer (A) is not specifically limited as far as it is a compound that can be inserted or coordinated (intercalated) between the unit crystal layers of the inorganic layered mineral (B), which will be described later. Examples of the water soluble polymer (A) include polyvinyl alcohol and its derivatives; cellulose derivatives such as carboxymethylcellulose and hydroxyethylcellulose; starches such as oxidized starch, etherified starch and dextrin; polyvinylpyrrolidone, polyacrylic acid, polymethacrylic acid or their ethers and salts, and copolymers thereof; copolymerized polyesters containing a polar group such as of sulfoisophthalic acid; vinyl polymers such as polyhydroxyethyl methacrylate and copolymers thereof; or functional group modified polymers such as those containing a carboxyl group or the like based on various types of polymers described above.

At least one of the water soluble polymers (A) is preferably a polyvinyl alcohol polymer and a derivative thereof. More preferably, the water soluble polymer (A) is a polyvinyl alcohol resin having a degree of saponification of 95% or more and a degree of polymerization of 300 or more.

The polyvinyl alcohol resin has lower hygroscopic and swellable properties with increase in the degrees of saponification and polymerization.

When the degree of saponification of polyvinyl alcohol resin is less than 95%, sufficient gas barrier properties are not achieved.

On the other hand, when the degrees of polymerization of polyvinyl alcohol resin is less than 300, the gas barrier properties and the film cohesive strength are lowered.

Inorganic Layered Mineral (B)

The inorganic layered mineral (B) refers to an inorganic compound in which extremely thin unit layers are superposed to form a single layered particle.

Substances of the inorganic layered mineral (B) are preferably those which swell and cleave in water. Of those substances, clay compounds having water-swellable properties are preferably used. More specifically, the inorganic layered mineral (B) is a clay compound in which water is coordinated between extremely thin unit crystal layers to impart absorptive and swellable properties. In general, the inorganic layered mineral (B) has a layered structure made up of layers having a tetrahedral structure in which $Si^{4+}$ is coordinated with $O^{2-}$, and layers having an octahedral structure in which $Al^{3+}$, $Mg^{2+}$, $Fe^{2+}$, $Fe^{3+}$ or the like is coordinated with $O^{2-}$ and $OH^-$, which are bonded at 1:1 or 2:1 and built up. The clay compound may be a natural compound or a synthetic compound.

Typical examples of inorganic layered mineral (B) may be hydrous silicates such as phyllosilicate minerals, including, for example, kaolinite clay minerals such as halloysite, kaolinite, endellite, dickite and nacrite; antigorite clay minerals such as antigorite and chrysotile; smectite clay minerals such as montmorillonite, beidellite, nontronite, saponite, hectorite, sauconite and stevensite; vermiculite clay minerals such as vermiculite; micas such as white mica and bronze mica; and micas or mica clay minerals such as margarite, tetra-silicic mica and taeniolite.

The inorganic layered minerals (B) may be used singly or in a combination of two or more.

Of those inorganic layered minerals (B), smectite clay minerals such as montmorillonite and mica clay minerals such as water-swellable mica are particularly preferred.

The inorganic layered mineral (B) preferably has an average particle diameter of 10 μm or less and a thickness of 500 nm or less. More preferably, at least one of the inorganic layered mineral (B) is water-swellable synthetic mica having the average particle diameter in the range from 1 μm to 10 μm and the thickness in the range from 10 nm to 100 nm.

When used for the inorganic layered mineral (B), water-swellable synthetic mica, which has high miscibility with the water soluble polymer (A) and contains less impurities compared with natural mica, does not lead to decrease in gas barrier properties or film cohesiveness derived from the impurities. Further, water-swellable synthetic mica, which contains fluorine atoms in the crystal structure, also contributes to minimizing the humidity dependence of the gas barrier properties of the layer made of the aqueous coating agent (C). Moreover, compared with other types of water-swellable inorganic layered mineral, water-swellable synthetic mica has a high aspect ratio and hence can more effectively exert a labyrinth effect, thereby particularly contributing to developing the gas barrier properties of the layer made of the aqueous coating agent (C).

The solid content formulation ratios of the inorganic layered mineral (B) to the total solid content of the aqueous coating agent (C) is preferably in the range from 10 mass % to 70 mass %, more preferably in the range from 15 mass % to 50 mass %.

When the solid content formulation ratio of the inorganic layered mineral (B) is less than 10 mass %, the labyrinth effect of the inorganic layered mineral (B) is not well exhibited and the gas barrier properties of the first layer is low in a high-humidity atmosphere.

On the other hand, when the solid content formulation ratio of the inorganic layered mineral (B) is over 70 mass %, coatability of coating liquid and adhesiveness to the substrate are low.

Aqueous Polyurethane Resin

The aqueous coating agent (C) preferably contains an aqueous polyurethane resin having water solubility or water dispersibility. The aqueous coating agent (C) which contains only the water soluble polymer (A) and the inorganic layered mineral (B) has good coatability and adhesiveness to a polyester resin with high polarity such as polyethylene terephthalate or polybutylene terephthalate. However, the aqueous coating agent (C) which contains only the water soluble polymer (A) and the inorganic layered mineral (B) does not have adhesiveness to a resin with no polarity and low surface tension such as polyolefin resin including polyethylene, polypropylene and propylene-ethylene copolymer.

On the other hand, the aqueous coating agent (C) which contains an aqueous polyurethane resin and a curing agent, which will be described later, in addition to the water soluble polymer (A) and inorganic layered mineral (B), exhibits good adhesiveness to a resin with no polarity and low surface tension such as polyolefin resin as well.

The aqueous urethane resin is not specifically limited. Examples of aqueous urethane resin obtained by the reaction between polyol and an isocyanate compound include an aqueous urethane resin obtained by a conventional reaction between polyester polyol and polyisocyanate. Further, the aqueous urethane resin may contain a chain extender as necessary.

Polyester polyol is obtained by a conventional reaction between dicarboxylic acid and glycol.

Examples of dicarboxylic acid include an aromatic dicarboxylic acid such as terephthalic acid, isophthalic acid or 2,6-naphthalenedicarboxylic acid, aliphatic dicarboxylic acid such as adipic acid or sebacic acid, oxycarboxylic acid such as oxybenzoic acid, and ester forming derivatives thereof.

Examples of glycol include aliphatic glycols such as ethylene glycol, 1,4-butanediol, diethylene glycol, triethylene glycol, aromatic diols such as 1,4-cyclohexane dimethanol, and poly (oxy alkylene) glycols such as polyethylene glycol, polypropylene glycol or polytetramethylene glycol.

Further, while polyester polyol obtained by the reaction between dicarboxylic acid and glycol has a linear structure, a branched polyester can be formed by using an ester-forming constituent which is trivalent or more.

Examples of polyisocyanate include an adduct of hexamethylene diisocyanate, diphenylmethane diisocyanate, tolylene diisocyanate, isophorone diisocyanate, tetramethylene diisocyanate, xylylene diisocyanate, lysine diisocyanate, tolylene diisocyanate with trimethylolpropane, and an adduct of hexamethylene diisocyanate with trimethylol ethane.

Further, examples of chain extender includes pendant carboxyl group-containing diols, glycols such as ethylene glycol, diethylene glycol, propylene glycol, 1,4-butanediol, hexamethylene glycol and neopentyl glycol, and diamines such as ethylene diamine, propylene diamine, hexamethylene diamine, phenylene diamine, tolylene diamine, diphenyl diamine, diamino diphenyl methane and diamino cyclohexyl methane.

The aqueous polyurethane resins having the water solubility or water dispersibility of the above structure include, for example, the aqueous polyurethane resin described in JP-A-S61-228030.

Curing Agent

The curing agent is not specifically limited as far as it is reactive to at least one of the water soluble polymer (A) and aqueous polyurethane resin. Particularly, a water dispersible (water soluble) carbodiimide, a water soluble epoxy compound, a water dispersible (water soluble) oxazolidone compound, a water soluble aziridine compound, a water dispersible isocyanate curing agent and the like are preferably used for the curing agent. Specifically, of these curing agents, a water dispersible isocyanate curing agent, which reacts easily with hydroxyl groups of a water soluble urethane resin, is preferably used.

The solid content formulation ratios of the curing agent to the total solid content of the aqueous coating agent (C) is preferably in the range from 5 mass % to 15 mass %. When the solid content formulation ratio of the curing agent to the total solid content of the aqueous coating agent (C) is less than 5 mass %, the adhesiveness of the first layer made of the aqueous coating agent (C) to the resin film substrate is lowered. On the other hand, when the solid content formulation ratio of the curing agent to the total solid content of the aqueous coating agent (C) is more than 15 mass %, the gas barrier properties of the first layer made of the aqueous coating agent (C) is lowered.

Examples of polyisocyanate compound used for the water dispersible isocyanate curing agent include aromatic polyisocyanate compounds, alicyclic polyisocyanate compounds and aliphatic polyisocyanate compounds. Of these compounds, alicyclic polyisocyanate compounds and aliphatic polyisocyanate compounds are preferably used in order to suppress reactions in the aqueous coating agent (C) and extend a usable period of time.

Examples of isocyanate compounds constituting alicyclic polyisocyanate compounds include bis(isocyanate) methylcyclohexane (hydrogenated XDI), and methylenebis(4,1-cyclohexylene)=diisocyanate (hydrogenated MDI).

Examples of isocyanate compounds constituting aliphatic polyisocyanate compounds include trimethylene diisocyanate, 1,2-propylene diisocyanate, butylene diisocyanate (tetramethylene diisocyanate), hexamethylene diisocyanate and pentamethylene diisocyanate.

Aromatic polyisocyanate compounds, alicyclic polyisocyanate compounds, and aliphatic polyisocyanate compounds can be used as a mixture.

The solid content formulation ratios of the aqueous polyurethane resin to the total solid content of the aqueous coating agent (C) is preferably 10 mass % or more.

When the solid content formulation ratio of the aqueous polyurethane resin to the total solid content of the aqueous coating agent (C) is less than 10 mass %, wettability and adhesiveness of the first layer made of the aqueous coating agent (C) to the resin film substrate is insufficient.

The solid content formulation ratios of the water soluble polymer (A), the inorganic layered mineral (B), the aqueous polyurethane resin and the curing agent to the total solid content of the aqueous coating agent (C) are preferably in the following ranges:

Water soluble polymer (A): 15 mass % to 60 mass %
Inorganic layered mineral (B): 10 mass % to 50 mass %
Aqueous polyurethane resin: 10 mass % to 50 mass %
Curing agent: 5 mass % to 15 mass %

When the solid content formulation ratios of the water soluble polymer (A), the inorganic layered mineral (B), the aqueous polyurethane resin and the curing agent to the total solid content of the aqueous coating agent (C) are in the above ranges, good gas barrier properties can be achieved in a high-humidity atmosphere. Further, when the second layer made of the coating agent (D) that contains titanium oxide is laminated on the first layer made of the aqueous coating agent (C), sufficient adhesive strength and film cohesive strength as a packaging material can be achieved for an extended period of time.

In addition, the aqueous coating agent (C) may contain a variety of additives to the extent that gas barrier properties and strength as a packaging laminate film are not compromised.

Examples of additives include antioxidant, weather-resistant agent, thermostabilizer, lubricant, nucleating agent, UV absorber, plasticizer, antistatic agent, coloring agent, filler, surfactant and silane coupling agent.

The aqueous coating agent (C) may contain water as a main solvent and may contain other solvents which dissolve or are uniformly dispersible in water.

Examples of the solvent include alcohols such as methanol, ethanol, isopropanol and the like, ketones such as acetone, methyl ethyl ketone and the like; ethers such as tetrahydrofuran; cellosolves; carbitols; and nitriles such as acetonitrile.

Coating Agent (D)

The coating agent (D) includes titanium oxide as a constituent.

While there are three types of crystal structure of titanium oxide, i.e., rutile and anatase in the tetragonal form and brookite in the orthorhombic form, rutile type titanium oxide is preferably used when the gas barrier film 1 according to this embodiment is applied to the packaging material.

Titanium oxide, which is a hard inorganic material, exhibits an anchor effect when disposed on the aqueous coating agent (C) and reinforces the cohesive strength of the second layer made of the coating agent (D).

In addition, when an adhesive is applied on the aqueous coating agent (C) by a dry lamination process, the adhesive infiltrates into the aqueous coating agent (C) and generates an interface having a low strength in the infiltrated region, which may cause decrease in laminate strength. The second layer made of the coating agent (D) which contains titanium oxide serves to prevent an adhesive from affecting the aqueous coating agent (C) when an adhesive is applied on the aqueous coating agent (C) by a dry lamination process.

A resin used for the coating agent (D) is not specifically limited as far as it is stably dispersible in a solvent along with titanium oxide. Examples of such a resin include polyurethane resin, polyurethane/urea resin, vinyl chloride-vinyl acetate copolymer resin, chlorinated polypropylene resin, ethylene-vinyl acetate copolymer resin, vinyl acetate resin, polyamide resin, nitrocellulose resin, acryl resin, polyester resin, polyvinyl chloride resin and the like. These resins may be used singly or in combination of two or more.

Examples of the solvent used for the coating agent (D) include ester solvents such as ethyl acetate, n-propyl acetate, isopropyl acetate, isobutyl acetate, propylene glycol monoethylether acetate and propylene glycol monomethyl ether-acetate, alcohol solvents such as methanol, ethanol, n-propanol, isopropanol, n-butanol and propylene glycol monomethylether, and known solvents such as water.

The coating agent (D) can be prepared by dispersing titanium oxide in a solvent to prepare a dispersion liquid of titanium oxide, followed by adding a resin to the dispersion liquid.

Grain distribution of titanium oxide in the dispersion liquid of titanium oxide can be adjusted by using a dispersion machine. Examples of dispersion machine include roller mills, ball mills, attritors and sand mills.

The coating agent (D) prepared by the above method preferably has a viscosity in the range of 10 mPa·s or more and 1000 mPa·s or less.

When the coating agent (D) has a viscosity of less than 10 mPa·s, titanium oxide is precipitated, and thus fails to appropriately disperse titanium oxide. On the other hand, when the coating agent (D) has a viscosity of more than 1000 mPa·s, the coating agent (D) cannot be efficiently prepared and applied.

The viscosity of the coating agent (D) can be adjusted by selecting the type and the amount of resin and solvent used as appropriate. Further, the viscosity of the coating agent (D) can also be adjusted by adjusting grain size and grain distribution of titanium oxide.

The layer made of the aqueous coating agent (C) or the coating agent (D) is manufactured by a known wet coating method.

Examples of the wet coating method include roll coating, gravure coating, reverse coating, die coating, screen printing, spray coating and the like.

By using these wet coating methods, the aqueous coating agent (C) or the coating agent (D) is applied on one surface (one surface, a first surface) or both surfaces (one surface and the other surface, the first surface and the second surface) of the resin film substrate to form a coating film made of the aqueous coating agent (C) or the coating agent (D). The coating film is dried to obtain the layer made of the aqueous coating agent (C) or the coating agent (D).

The coating film made of the aqueous coating agent (C) or the coating agent (D) is dried by a known drying method such as hot-air drying, heat roll drying or infrared radiation.

The thickness of the first layer 3 made of the aqueous coating agent (C) formed on the resin film substrate 2, that is, the dry thickness of the first layer 3 made of the aqueous coating agent (C) varies depending on the required gas barrier properties, and is preferably in the range from 0.2 µm to 2 µm, more preferably in the range from 0.3 µm to 1 µm.

If the thickness of the first layer 3 made of the aqueous coating agent (C) is less than 0.2 µm, sufficient gas barrier properties are not achieved. On the other hand, when the thickness of the first layer 3 made of the aqueous coating agent (C) is more than 2 µm, there is a difficulty in forming a uniform layer surface, leading to increase in drying load and manufacturing cost, which is not desirable.

The thickness of the second layer 4 made of the coating agent (D) formed on the resin film substrate 2, that is, the dry thickness of the second layer 4 made of the coating agent (D) is preferably 0.3 µm or more, more preferably 0.5 µm or more.

When the dry thickness of the second layer 4 made of the coating agent (D) is 0.5 µm or more, an adhesive can be prevented from being infiltrated into the first layer 3 made of the aqueous coating agent (C) when the adhesive is applied by dry lamination process.

The gas barrier film 1 of the present embodiment may be provided with an anchor coat layer, printing layer, overcoat layer, light-shielding layer, adhesive layer, heat seal layer and the like as necessary.

The gas barrier film 1 according to the present embodiment includes the resin film substrate 2, the layer 3 made of the aqueous coating agent (C) that contains the water soluble polymer (A) and the inorganic layered mineral (B), and the layer 4 made of the coating agent (D) that contains titanium oxide, which are disposed in this order on at least one surface of the resin film substrate. Accordingly, the gas barrier film 1 has good gas barrier properties in a high-humidity atmosphere and holds good adhesiveness between layers and film cohesiveness for an extended period of time. Therefore, use of the gas barrier film 1 of the present embodiment as a packaging material can enhance the preservation of product quality.

Gas Barrier Laminate 5

The gas barrier laminate according to the second embodiment of the present invention is a laminate that includes the gas barrier film 1 according to the first embodiment of the present invention, an adhesive layer 6 and a heat seal resin layer 7 disposed in this order on at least one surface of the gas barrier film 1.

That is, a gas barrier laminate 5 of the present embodiment is a laminate in which at least a heal seal resin layer 7 is disposed by a lamination process on the layer 4 made of the coating agent (D) which contains titanium oxide of the gas barrier film 1 according to the first embodiment of the present invention via the adhesive layer 6.

Examples of the heat seal resin layer 7 include polyolefin films such as low density polyethylene, linear low density polyethylene, medium density polyethylene and polypropylene, polyester copolymer films, polyacrylonitrile films and vinyl acetate copolymer films. Of these films, polyolefin films are particularly preferable since they are inexpensive and have good low-temperature heat sealing properties.

Examples of the lamination methods include known dry lamination methods, extrusion lamination methods and non-sol lamination methods.

Various adhesives can be appropriately selected for use in the adhesive layer 6 depending on the lamination methods. For example, known adhesives such as polyurethane adhesives, polyester adhesives, polyether adhesives, epoxy adhesive adhesives, polyethylene imine adhesives and polybutadiene adhesives can be used.

The gas barrier laminate 5 of the present embodiment is a laminate for packaging use in which the heal seal resin layer 7 is laminated on the gas barrier film 1 of the above embodiment via the adhesive layer 6 and has good gas barrier properties in a high-humidity atmosphere and holds good adhesiveness between layers and film cohesiveness for an extended period of time. Accordingly, the gas barrier laminate 5 of the present embodiment can enhance the preservation of product quality and can be used for a variety of packaging materials.

EXAMPLES

The present invention will be further described in detail by means of the Examples and Comparative Examples. However, the present invention is not intended to be limited to those Examples.

Example

Aqueous Coating Agent (C)

As the water soluble polymer (A) (hereinafter, also referred to as "component (A)"), polyvinyl alcohol resin Poval PVA-105 (with a degree of saponification of 98 to 99% and a degree of polymerization of 500), manufactured by Kuraray Co., Ltd., and carboxymethyl cellulose (CMC) were used.

As the inorganic layered mineral (B) (hereinafter, also referred to as "component (B)"), water-swellable synthetic mica (Somasif MEB-3, manufactured by Co-op chemical Co., Ltd.) or purified montmorillonite (Kunipia-F, manufactured by Kunimine Industries Co., Ltd.) was used.

As the aqueous polyurethane resin (hereinafter, also referred to as "component (E)"), polyurethane dispersion "Takelac WPB-341" manufactured by Mitsui Chemicals, Inc. was used.

The component (A), the component (B) and the component (E) were formulated at the solid content formulation ratio shown in Table 1, heated and mixed at 80° C., and cooled to room temperature. Then, the mixture was diluted with ion-exchange water and isopropanol so that 10 mass % of the solvent was made of isopropanol and the solid concentrations shown in Table 1 were obtained, thereby preparing a coating liquid.

The coating liquid was applied as it is if the coating liquid did not contain a curing agent.

If the coating liquid contained a curing agent, the curing agent shown in Table 1 (water dispersible polyisocyanate Takenate WD-725, manufactured by Mitsui Chemicals, Inc.) was added immediately before coating, thereby preparing the aqueous coating agent (C) of Examples 1 to 6.

Polyurethane Resin Synthesis Example

First, a four-necked flask provided with a stirrer, thermometer, reflux condenser and a nitrogen gas introducing tube was prepared. In the four-necked flask, 18.500 parts by weight of polyester (hydroxyl value 56, 1 mg KOH/g) with molecular weight 2000 which contains 3-methyl-1,5-pentanediol and adipic acid, 3.971 parts by weight of polypropylene glycol (hydroxyl value 56.1 KOH/g) with molecular weight 2000, 5.874 parts by weight of isophorone diisocyanate, 0.003 parts by weight of tin(II) 2-ethylhexanoate and 7.500 parts by weight of ethyl acetate were placed. This mixture was reacted under a nitrogen gas stream at 90° C. for 3 hours. The amount of 7.500 parts by weight of ethyl acetate was added to the reactant and was then cooled, thereby obtaining 43.347 parts by weight of an end isocyanate prepolymer solution.

Then, a mixture of 1.575 parts by weight of isophorone diamine, 0.081 parts by weight of 2-aminoethanol, 20.000 parts by weight of isopropyl alcohol and 20.000 parts by weight of ethyl acetate was added to 43.347 parts by weight of the resultant end isocyanate prepolymer solution at room temperature, and then 15.000 parts by weight of isopropyl alcohol was added. The resultant solution was reacted at 50° C. for 1 hour, thereby obtaining a polyurethane resin solution (PUO) with a solid content 30.0 mass % and weight average molecular weight 30000.

Coating Agent (D)

Titanium oxide JR-805 manufactured by Tayca Corporation was used.

The amount of 30 parts by weight of JR-805 and 11.5 parts by weight of vinyl chloride-vinyl acetate copolymer (monomer composition ratio: vinyl chloride 84 mass %/vinyl acetate 3 mass %/vinyl alcohol 13 mass %, number average molecular weight 22000, solid content 30 mass %, solvent:ethyl acetate) were stirred and mixed, and milled in a sand mill. After that, the amount of 30 parts by weight of the above polyurethane resin solution (PUO) and 13.5 parts by weight of n-propyl acetate/isopropyl alcohol mixture solvent (mass ratio 50/50) were added to the resultant mixture which was stirred and mixed, thereby obtaining a dispersion liquid of titanium oxide. Then, the amount of 50 parts by weight of diluting solvent, n-propyl acetate/isopropyl alcohol mixture solvent (mass ratio 50/50), was added to 100 parts by weight of this disperse liquid, thereby obtaining the coating agent (D).

The aqueous coating agent (C) of Examples 1 to 4 was applied on a corona-treated surface of the resin film substrate, biaxially stretched polyethylene terephthalate film (trade name: P-60, thickness 12 μm, manufactured by Toray Industries, Inc.) by using a gravure printing machine. Further, the aqueous coating agent (C) of Examples 5 to 6 was applied on a corona-treated surface of the biaxially stretched polypropylene film (trade name: U-1, thickness 20 μm, manufactured by Mitsui Chemicals Tohcello, Inc.) by using a gravure printing machine. Accordingly, the layer made of the aqueous coating agent (C) of Examples 1 to 6 was formed at a thickness of 0.5 μm.

Further, the coating agent (D) was applied on a layer made of the aqueous coating agent (C) of Examples 1 to 6 so that the layer made of the coating agent (D) of Examples 1 to 6 was formed at a thickness of 1 μm, thereby obtaining the gas barrier film of Examples 1 to 6.

The thicknesses of the layer made of the aqueous coating agent (C) and the layer made of the coating agent (D) were confirmed by using a scanning type electron microscope (scanning electron microscope, SEM).

Comparative Example

The component (A), the component (B) and the component (E) were formulated at the solid content formulation ratio shown in Table 2, heated and mixed at 80° C., and cooled to room temperature. Then, the mixture was diluted with ion-exchange water and isopropanol so that 10 mass % of the solvent was made of isopropanol and the solid concentrations shown in Table 2 were obtained, thereby preparing a coating liquid.

The coating liquid was applied as it is if the coating liquid did not contain a curing agent.

If the coating liquid contained a curing agent, the curing agent shown in Table 2 (water dispersible polyisocyanate Takenate WD-725, manufactured by Mitsui Chemicals, Inc.) was added immediately before coating, thereby preparing the aqueous coating agent (C) of Comparative Examples 1 to 8.

Comparative Examples 1 to 6

The aqueous coating agents (C) of Comparative Examples 1 to 4 were applied on a corona-treated surface of biaxially stretched polyethylene terephthalate film (trade name: P-60, 12 μm thickness, manufactured by Toray Industries, Inc.) or the aqueous coating agents (C) of Comparative Examples 5 to 6 were applied on a corona-treated surface of biaxially stretched polypropylene film (trade name: U-1, 20 μm thickness, manufactured by Mitsui Chemicals Tohcello Inc.), which was a resin film substrate, by using a gravure printing machine so that the layer made of the aqueous coating agent (C) of Comparative Examples 1 to 6 was formed at a thickness of 0.5 μm, thereby obtaining the gas barrier film of Examples 1 to 6.

The thicknesses of the layer made of the aqueous coating agent (C) was confirmed by using a scanning type electron microscope (SEM).

Comparative Example 7

The amount of 30 parts by weight of the polyurethane resin solution (PUO) and 13.5 parts by weight of n-propyl acetate/isopropyl alcohol mixture solvent (mass ratio 50/50) were stirred and mixed, thereby obtaining disperse liquid. Then, the amount of 50 parts by weight of diluting solvent, n-propyl acetate/isopropyl alcohol mixture solvent (mass ratio 50/50), was added to 100 parts by weight of this dispersion liquid, thereby obtaining the coating agent (D) of Comparative Example 7.

The aqueous coating agent (C) of Comparative Example 7 was applied on a corona-treated surface of the resin film substrate, biaxially stretched polyethylene terephthalate film (trade name: P-60, thickness 12 μm, manufactured by Toray Industries, Inc.) by using a gravure printing machine so that the layer made of the aqueous coating agent (C) of Comparative Example 7 was formed at a thickness of 0.5 μm.

Further, the coating agent (D) of Comparative Example 7 was applied on a layer made of the aqueous coating agent (C) of Comparative Example 7 by using a gravure printing machine so that the layer made of the coating agent (D) of Comparative Example 7 was formed at a thickness of 1 μm, thereby obtaining the gas barrier film of Comparative Example 7.

The thicknesses of the layer made of the aqueous coating agent (C) and the layer made of the coating agent (D) were confirmed by using a scanning type electron microscope (SEM).

Comparative Example 8

The amount of 7.4 parts by weight of pigment red 81:2 (Fanal Pink D4830, manufactured by BASF), 33 parts by weight of polyurethane resin solution (PUO), 20 parts by weight of N-propyl acetate, and 4 parts by weight of isopropyl alcohol were stirred and mixed, and milled in a sand mill. After that, the amount of 20 parts by weight of polyurethane resin solution (PUO), 12 parts by weight of N-propyl acetate, and 3.6 parts by weight of isopropyl alcohol were added, thereby obtaining disperse liquid. Then, the amount of 50 parts by weight of diluting solvent, n-propyl acetate/isopropyl alcohol mixture solvent (mass ratio 50/50), was added to 100 parts by weight of this disperse liquid, thereby obtaining the coating agent (D) of Comparative Example 8.

The aqueous coating agent (C) of Comparative Example 8 was applied on a corona-treated surface of the resin film substrate, biaxially stretched polyethylene terephthalate film (trade name: P-60, thickness 12 μm, manufactured by Toray Industries, Inc.) by using a gravure printing machine. Accordingly, the layer made of the aqueous coating agent (C) of Comparative Example 8 was formed on the film at a thickness of 0.5 μm.

Further, the coating agent (D) of Comparative Example 8 was applied on a layer made of the aqueous coating agent (C) of Comparative Example 8 by using a gravure printing machine so that the layer made of the coating agent (D) of Comparative Example 8 was formed at a thickness of 1 μm, thereby obtaining the gas barrier film of Comparative Example 8.

The thicknesses of the layer made of the aqueous coating agent (C) and the layer made of the coating agent (D) were confirmed by using a scanning type electron microscope (SEM).

Evaluation (1) Oxygen Gas Barrier Properties

For the gas barrier films of Examples 1 to 6 and Comparative Examples 1 to 8, oxygen transmissivity was measured by using an oxygen transmission rate tester (trade name: OXTRAN-2/20, manufactured by Mocon Inc.) in an atmosphere at 20° C. and 80% humidity. The results are shown in Tables 1 and 2.

(2) Laminate Strength

A 30 μm thick non-stretched polypropylene film (trade name: CPP GLC, manufactured by Mitsui Chemicals Tohcello Inc.) was laminated on a coating surface of each of the gas barrier films of Examples 1 to 6 and Comparative Examples 1 to 8 via a polyester urethane adhesive (trade name: Takelac A-525, Takenate A-52, manufactured by Mitsui Chemicals Inc.) by a dry lamination process.

The resultant laminate was aged at 40° C. for 48 hours to obtain a laminate film.

The laminate film was cut into 15 mm wide rectangular pieces. Then, the gas barrier film was peeled off from the laminate film at an angle of 90 degrees between the non-stretched polypropylene film and the gas barrier film at a rate of 300 mm/min by using a tensile tester Tensilon for measurement of lamination strength. The results are shown in Tables 1 and 2.

(3) Laminate Strength after Being Left for 2 Months at 40° C. and 75% Humidity

A 30 μm thick non-stretched polypropylene film (trade name: CPP GLC, manufactured by Mitsui Chemicals Tohcello Inc.) was laminated on a coating surface of each of the gas barrier films of Examples 1 to 6 and Comparative Examples 1 to 8 by a dry lamination process via a polyester urethane adhesive (trade name: Takelac A-525, Takenate A-52, manufactured by Mitsui Chemicals Inc.), and cured at 40° C. for 48 hours to obtain laminate films.

The laminate film was stored in a thermostatic chamber for two months under a condition of 40° C. and 75% humidity.

The laminate film after being stored for two months under the above condition was cut into 15 mm wide rectangular pieces. Then, the gas barrier film was peeled off from the laminate film at an angle of 90 degrees between the non-stretched polypropylene film and the gas barrier film at a rate of 300 mm/min by using a tensile tester Tensilon for measurement of lamination strength. The results are shown in Tables 1 and 2.

TABLE 1

|  | Aqueous coating agent (C) | Organic coating agent (D) | Coating substrate | Oxygen transmissivity ($cm^3$/ $m^2 \cdot day \cdot MPa$) | Initial peeling strength (N/15 mm) | Peeling strength after 2 months (N/15 mm) |
|---|---|---|---|---|---|---|
| Example 1 | PVA-105/Somasif 80/20 | Titanium oxide | PET | 25 | 1.8 | 1.6 |
| Example 2 | PVA-105/Somasif 60/40 | Titanium oxide | PET | 15 | 1.5 | 1.5 |
| Example 3 | PVA-105/Kunipia-F 40/60 | Titanium oxide | PET | 30 | 2 | 1.9 |
| Example 4 | CMC/Kunipia-F 40/60 | Titanium oxide | PET | 35 | 1.7 | 1.5 |
| Example 5 | PVA-105/Somasif/ WPB-341/WD-725 30/30/30/10 | Titanium oxide | OPP | 30 | 1.7 | 1.7 |
| Example 6 | PVA-105/Kunipia-F/ WPB-341/WD-725 30/30/30/10 | Titanium oxide | OPP | 45 | 2.1 | 2 |

TABLE 2

|  | Aqueous coating agent (C) | Organic coating agent (D) | Substrate | Oxygen transmissivity ($cm^3$/ $m^2 \cdot day \cdot MPa$) | Initial peeling strength (N/15 mm) | Peeling strength after 2 months (N/15 mm) |
|---|---|---|---|---|---|---|
| Comparative Example 1 | PVA-105/Somasif 80/20 | none | PET | 35 | 1.2 | 0.4 |
| Comparative Example 2 | PVA-105/Somasif 60/40 | none | PET | 20 | 0.5 | 0.3 |
| Comparative Example 3 | PVA-105/Kunipia-F 40/60 | none | PET | 40 | 1.1 | 0.5 |
| Comparative Example 4 | CMC/Kunipia-F 40/60 | none | PET | 50 | 0.9 | 0.4 |
| Comparative Example 5 | PVA-105/Somasif/ WPB-341/WD-725 30/30/30/10 | none | OPP | 40 | 0.4 | 0.2 |
| Comparative Example 6 | PVA-105/ Kunipia-F/ WPB-341/WD-725 30/30/30/10 | none | OPP | 50 | 0.7 | 0.4 |
| Comparative Example 7 | PVA-105/Somasif 80/20 | Only polyurethane resin | PET | 30 | 1 | 0.4 |
| Comparative Example 8 | PVA-105/Somasif 80/20 | Pigment red 81:2 | PET | 35 | 0.5 | 0.2 |

As seen from the results of Table 1, the gas barrier film of Examples 1 to 6 maintained both the oxygen gas barrier properties in an atmosphere at 20° C. and 80% humidity and the laminate strength after lapse of two months, since the gas barrier film included the layer made of the aqueous coating agent (C) that contained the water soluble polymer (A) and the inorganic layered mineral (B) and the layer made of the coating agent (D) that contained titanium oxide, and the aqueous coating agent (C) had good oxygen gas barrier properties in a high-humidity atmosphere.

Further, in Examples 5 and 6, in which aqueous polyurethane resin and a curing agent were contained as components of the aqueous coating agent (C), good adhesiveness was exhibited to a resin with no polarity and low surface tension such as a polypropylene resin.

In Comparative Examples 1 to 6, in which a layer made of the coating agent (D) that contained titanium oxide was not coated, the results showed that the laminate strength was low compared with Examples 1 to 6. Further, in Comparative Examples 7 to 8, in which a layer made of the coating agent (D) that did not contain titanium oxide was laminated, the results showed that the laminate strength was also low.

In addition, for barrier packaging materials used for packages of food products or pharmaceutical products, it is preferable that oxygen gas barrier properties in an atmosphere at 20° C. and 80% humidity is 100 $cm^3/m^2/day/MPa$ or less, and the laminate strength after being left for two months at 40° C. and 75% humidity is 1 N/15 mm or more.

INDUSTRIAL APPLICABILITY

The gas barrier film and the gas barrier laminate of the present invention have good gas barrier properties in a high-humidity atmosphere and hold good adhesiveness between layers and film cohesiveness for an extended period of time. Accordingly, the gas barrier film and the gas barrier laminate of the present invention can be used as a packaging material to enhance the preservation of product quality and can be applied to a variety of packaging applications.

REFERENCE SIGNS LIST

1 gas barrier film
2 resin film substrate 3 layer (first layer, gas barrier layer)
4 second layer (second layer, titanium oxide-containing layer)
5 gas barrier laminate
6 adhesive layer
7 heat seal resin layer

What is claimed is:

1. A gas barrier laminate comprising
(a) a gas barrier film comprising:
a substrate, which comprises a biaxially stretched polyethylene terephthalate film or a biaxially stretched polypropylene film;
a first layer made of an aqueous coating agent (C) that contains 15 mass % to 60 mass % of a water soluble polymer (A), which is a polyvinyl alcohol resin, 10 mass % to 50 mass % of an inorganic layered mineral (B), which is water-swellable mica, about 30% of an aqueous polyurethane resin having water solubility or water dispersibility, and about 10% of a water-dispersible isocyanate curing agent; and
a second layer made of a coating agent (D) that contains titanium oxide and has a viscosity in the range of 10 mPa·s or more and 1000 mPa·s or less, wherein the coating agent (D) is prepared by dispersing the titanium oxide in a solvent to prepare a dispersion liquid of the titanium oxide, followed by adding a polyurethane resin to the dispersion liquid, the first layer and the second layer being disposed in this order on at least one surface of the resin film substrate, wherein the second layer comprises about 71 mass % of the titanium oxide, about 21 mass % of the polyurethane resin and about about 8 mass % of vinyl chloride-vinyl acetate copolymer; and
(b) a non-stretched polypropylene film adhered to the second layer via an adhesive layer comprising a polyester urethane adhesive.

2. The gas barrier laminate of claim 1, wherein the vinyl chloride-vinyl acetate copolymer has a monomer composition ratio of 84 mass % vinyl chloride/3 mass % vinyl acetate/13 mass % vinyl alcohol.

* * * * *